Aug. 22, 1944.  J. L. JOHNSTON  2,356,245
CENTRIFUGAL CHUCK
Filed May 26, 1943  2 Sheets-Sheet 1

INVENTOR
JAMES L. JOHNSTON.
BY
ATTORNEYS

Aug. 22, 1944. J. L. JOHNSTON 2,356,245
CENTRIFUGAL CHUCK
Filed May 26, 1943 2 Sheets-Sheet 2
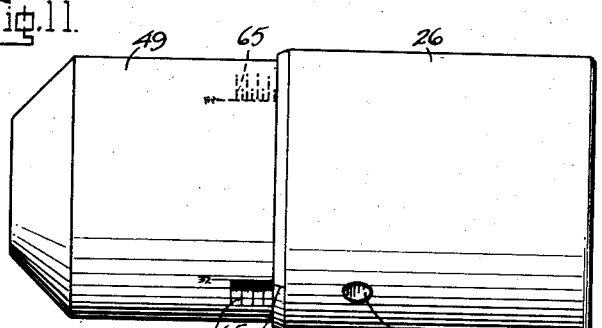
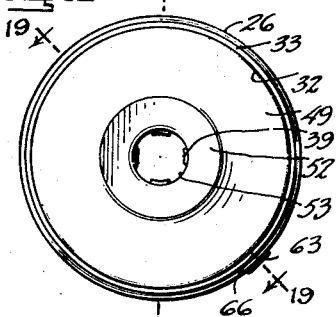
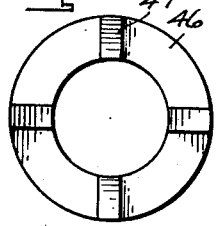
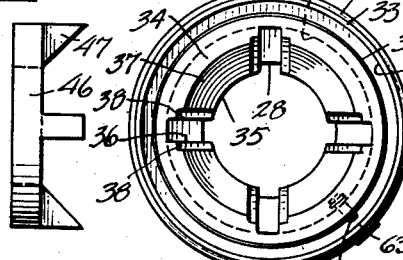
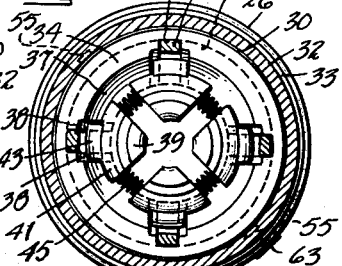
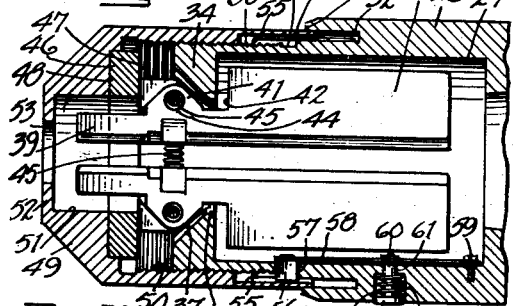
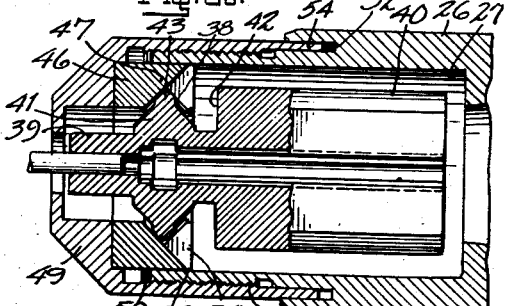
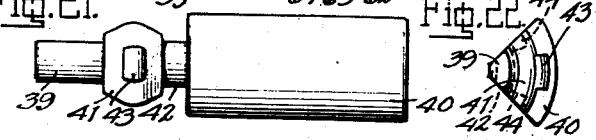
INVENTOR
JAMES L. JOHNSTON.
BY
ATTORNEYS Patented Aug. 22, 1944

2,356,245

UNITED STATES PATENT OFFICE 2,356,245

CENTRIFUGAL CHUCK

James L. Johnston, Denver, Colo., assignor to Remington Arms Company, Inc., Bridgeport, Conn., a corporation of Delaware Application May 26, 1943, Serial No. 488,544

10 Claims. (Cl. 279—9)

The present invention relates to a centrifugal chuck, particularly for use in such machines as pedestal grinders, lathes, or the like, and has for an object to provide a chuck, into which the work piece is placed, and which is adapted through centrifugal action during the rotation of the machine spindle carrying the chuck to automatically grip the work piece in axially centered relation. In chucking devices heretofore in use, the usual practice has been to close and open the chuck jaws by means of a manually operated tool into gripping and releasing relation. This operation was both time-consuming and required considerable adjustment to correctly center the work piece. In performing various production operations such as lapping, it is highly desirable that the work pieces may be quickly placed into and removed from the chuck, and that they be accurately centered during the work thereon, and it is proposed according to the invention to provide a chuck which is quick-acting, accurate in its gripping relation, and capable of gripping the work piece with sufficient force to hold it firmly, while at the same time eliminating any chance of mutilating it, and such as may occur with the usual manually operated chuck where the jaws are apt to be forced into too tight relation with the work.

It is further proposed, according to one of the forms of the invention, to provide a centrifugal chuck wherein the jaws may be preliminarily adjusted within close and accurate limits to receive work pieces of predetermined dimension, so that the same chuck can be readily adapted for work of various diameters over a relatively large range.

A further object is to provide a centrifugal chuck entirely free of gears, link connections, and other such mechanisms requiring lubrication and which are subject to rapid wear and deterioration.

With the above and other objects in view, embodiments of the invention are shown in the accompanying drawings, and these embodiments will be hereinafter more fully described with reference thereto, and the invention will be finally pointed out in the claims.

In the drawings—

Fig. 11 is a side elevation of a centrifugal chuck, according to another form of the invention.

Fig. 12 is an elevation of the forward end thereof.

Fig. 13 is a vertical longitudinal sectional view, taken along the line 13—13 of Fig. 12.

Fig. 14 is a detail elevation of the inner side of the adjustment cam member employed.

Fig. 15 is a side elevation thereof.

Fig. 16 is a detail elevation of the inner end of the chuck body, the chuck jaws being removed.

Fig. 17 is a transverse vertical sectional view, taken along the line 17—17 of Fig. 13.

Fig. 18 is a transverse vertical sectional view, taken along the line 18—18 of Fig. 13.

Fig. 19 is a longitudinal sectional view, taken along the diagonal line 19—19 of Fig. 12.

Fig. 20 is a vertical longitudinal sectional view, similar to Fig. 13, but showing the chuck jaws adjusted to receive a work piece of relatively smaller diameter.

Fig. 21 is a detail outside elevation of one of the chuck jaws.

Fig. 22 is an elevation of the forward end thereof.

Similar reference characters indicate corresponding parts throughout the several figures of the drawings.

Figure 1:
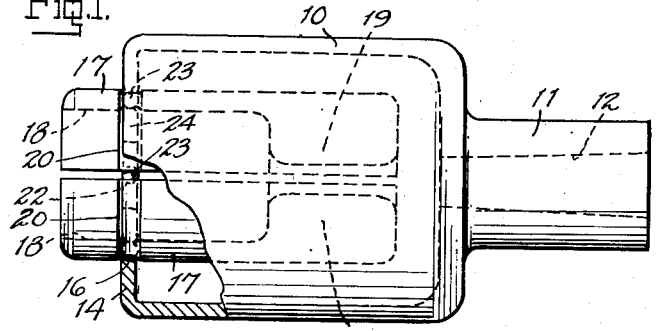
Fig. 1 is a side elevation, partially broken away, of a centrifugal chuck, according to one form of the invention, and especially adapted for use in a grinding machine for lapping or similar operations.
Figure 2:
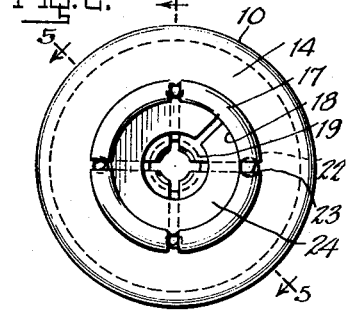
Fig. 2 is an elevation of the forward end of the chuck.
Figure 3:
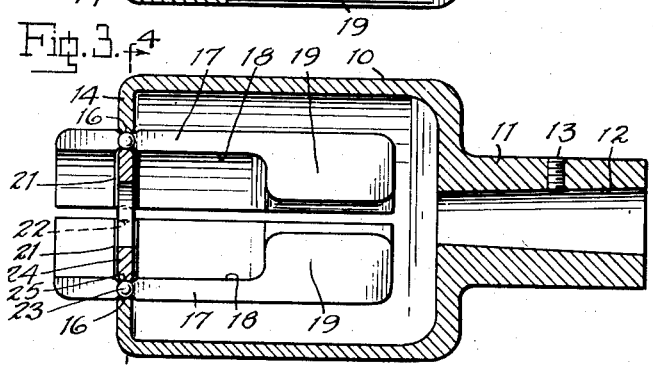
Fig. 3 is a longitudinal vertical sectional view, taken along the line 3—3 of Fig. 2.
Figure 4:
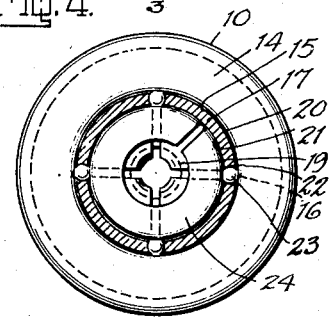
Fig. 4 is a transverse vertical sectional view, taken along the line 4—4 of Fig. 3, the forward sides of the chuck body and the insert washer member being shown in elevation.

Referring to the drawings, and more particularly to Figs. 1 to 10 thereof, the centrifugal chuck, according to the illustrated exemplary embodiment of the invention shown therein, comprises a cylindrical hollow chuck body 10, provided at its rearward or base end with a cylindrical mounting extension 11 provided with a tapered bore 12 therethrough, which is adapted to be fitted upon the tapered end of the spindle of the grinder, lathe, or other machine upon which the chuck is mounted. A set screw 13 for securing the chuck body to the spindle is provided in the mounting extension 11. At its forward end the chuck body is provided with an inwardly extending flange 14 surrounding a circular opening 15, and which flange is adapted to support upon its inner periphery within the opening 15 the centrifugally actuated chuck jaws, presently to be more fully referred to. At four equally spaced points in the periphery of the flange 14 there are provided spherical sockets 16, for the purpose of receiving and positioning the ball-bearing pivot-support members of the chuck jaws, as will presently more fully appear.

The chuck jaws are preferably four in number and in their assembled and parallel relation are of cylindrical form split longitudinally by diametrically extending slots disposed at right angles to each other to provide four segmental chuck jaw members 17. These are hollowed out at their forward portions, as at 18, to provide work receiving gripping jaw levers and solid at their rearward portions, to provide weights 19. Near the forward end each of the jaw members is provided at its outer periphery with a circumferential concave groove 20 and at its inner periphery with a circumferential concave groove 21 aligned with the groove 19, the concavities of these grooves being formed upon a radius substantially larger than the radius of the rounded peripheral edge of the flange 14, and which is engaged in the outer groove 20 in the operative position of the chuck jaws, for the purpose of permitting swinging movement of the chuck jaws under centrifugal action, as will presently more fully appear.

In each longitudinal face surface of each chuck jaw there is provided a spherical socket 22 for receiving the pivot-support ball-bearing 23, one of which is disposed between each of the chuck jaws to support them in separated relation and to provide trunnion pivot supports upon which the intermediate chuck jaw is suspended to swing through centrifugal action. The diameter of the ball-bearings 23 is slightly greater than the thickness of the chuck jaw between the opposed grooves 20 and 21, so that the ball-bearings project beyond the circumferential center lines of these grooves, their outwardly projecting surfaces being engaged in the spherical sockets 16 of the flange 14, so that the assembled chuck jaws and pivot-support ball-bearings are supported upon the flange 14 against longitudinal displacement, as well as against relative turning in the chuck body.

A split springy washer member 24, having a concave groove 25 in its periphery, is forced into engagement with the inwardly projecting surfaces of the ball-bearings 23, and constitutes a limit stop for the insertion of the work piece in the forwardly projecting chuck jaws. This washer may be dispensed with, if desired, in the case of a work piece which does not need to be limited thereby in its engagement with the chuck jaws, or other suitable stop means may be provided, as, for instance, projecting lugs formed upon the inner surfaces of the chuck jaws.

Figure 5:
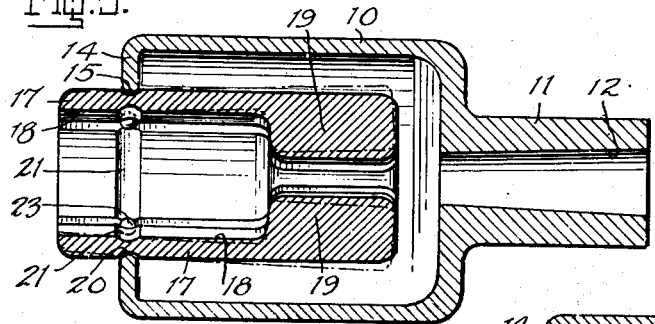
Fig. 5 is a longitudinal sectional view, taken along the diagonal line 5—5 of Fig. 2, the insert washer being removed for the sake of clearness.
Figure 8:
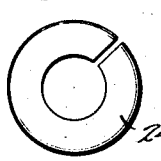
Fig. 8 is a detail front elevation of the insert washer member employed.
Figure 9:
Fig. 9 is an edge elevation thereof.
Figure 6:
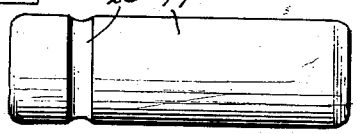
Fig. 6 is a detail outside elevation of one of the chuck jaw members.
Figure 10:
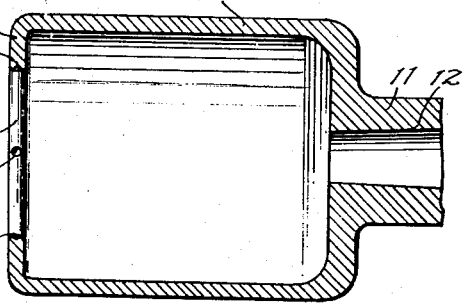
Fig. 10 is a detail longitudinal vertical sectional view of the chuck body, the chuck jaws being removed.
Figure 7:
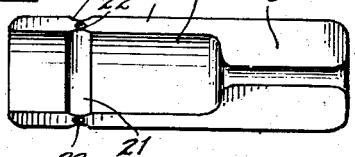
Fig. 7 is a detail inside elevation thereof.

In operation, the work piece, as for instance a die to be lapped, is placed within the forwardly projecting chuck jaws against the limit stop washer 24, and upon rotation of the chuck centrifugal force forces the inner weighted ends 19 outwardly causing the jaws to swing inwardly at their forward ends about the pivot-support ball-bearings 23, effectually centralizing and gripping the work piece. Fig. 5 illustrates in dot-and-dash lines the manner in which the chuck jaws swing about their pivots under centrifugal force, the extent of the movement illustrated being somewhat exaggerated. As soon as rotation of the chuck is stopped, the chuck jaws resume their normal position and release the work piece, which may be lifted readily therefrom, the whole operation being carried out simply by placing a work piece in the chuck at the beginning of the operation and lifting it out as the operation is completed, without any necessity for manual gripping or releasing operations and without the use of supplementary tools, such as wrenches or the like.

In Figs. 11 to 22 there is illustrated another form of the invention, especially suitable for lathe use, and in which the chuck jaws may be preliminarily adjusted to approximately fit them to receive work of various diameters.

The chuck body 26 is of generally cylindrical form, provided with a cylindrical pocket 27 extending inwardly from its forward end and provided at its rearward end with a thickened mounting portion having a tapered passage 28 therethrough adapted to be engaged with the tapered spindle of the lathe or other machine to which the chuck is attached, there being a set screw 29 provided in the mounting portion for engaging the spindle. The outer diameter of the chuck body is reduced at its forward end portion and is provided with an external screw thread 30, terminating in an annular groove 31, from which an annular cylindrical recess 32 extends rearwardly into an annular shoulder 33 of the chuck body, the inner periphery of this recess being slightly greater in diameter than the outside diameter of the screw threads 30.

Within the forward end of the pocket 27 there is provided an inwardly extending flange wall 34, having a central aperture 35, and provided at four equally spaced points with radial slots 36 extending longitudinally therethrough, the bases of these slots being substantially coincident with the cylindrical surface of the pocket 27. The forward side of the flange wall 34 is provided with a conical recess 37 extending from a point substantially inwardly of the outer periphery of the chuck body to the aperture 35, the angle of this conical recess being preferably substantially 45°. At the sides of each of the slots 36 there are provided slideway channels 38—38, disposed in inclined relation parallel to the inclined surface of the conical recess 37 and adapted to constitute supporting slideways for the pivot mountings of the chuck jaws, as will presently more fully appear.

The chuck jaws are preferably four in number, and in their assembled relation constitute spaced segments of a cylinder, each jaw comprising a forward work gripping jaw portion 39, a rearward outwardly extending weight portion 40, and an intermediate pivot portion 41, the latter being in the form of a circumferential rounded ridge having side surfaces inclined downwardly at each side at angles of substantially 45°. The rearward side surface of the pivot portion is sufficiently spaced from the forward shoulder of the weight portion 40 to provide an annular recess 42, within which the flange wall 34 of the chuck body is engaged, with substantial clearance at all sides in the assembled relation of the chuck jaws. Centrally of the circumferential ridge of the pivot portion 41 there is provided a projecting circumferential pivot boss 43, of substantially cylindrical cross-section longitudinally of the chuck jaw, and substantially corresponding in width to the space between the side walls of the slideway channels 38—38 at each side of the slots 36, so that in the assembled relation this boss seats upon these slideway channels in spanning relation to the slot 36. In each of the longitudinal side surfaces of the intermediate pivot portion 41 there is provided a circular pocket 44 within which are pocketed the ends of circumferentially arranged helical compression springs 45. Four of these springs are provided, one between each chuck jaw where they are retained under compression, so that the chuck jaws are maintained in equally spaced relation to each other and a constant outward pressure is exerted thereon tending to press the pivot bosses 43 into engagement with the inclined slideway channels 38—38.

A cam ring 46, having an outside diameter corresponding to the diameter of the pocket 27 of the chuck body and an inside diameter corresponding to the aperture 35 of the flange wall 34, is provided at equally spaced points with four cam projections 47, of triangular form, having their outer horizontal surfaces flush with the outer periphery of the ring and their inner inclined surfaces extending from the inner periphery at an angle of substantially 45°. These cam projections are adapted in the assembled relation to the chuck to be slidably engaged in fitting relation within the slots 36 of the flange wall 34, with their inclined surfaces intersecting the inclined surfaces of the slideway channels 38—38 at an angle of substantially 90°, and engaged with the pivot bosses 43 of the chuck jaws at the opposed side from their engagement with the slideway channels 38—38, so that the cam surfaces with the slideway channels constitute V-shaped pivot bearings for the pivot bosses 43, as clearly indicated in Fig. 13.

The cam ring is mounted at its outer end in an annular recess 48 provided in a cup-shaped closure shell 49, engaged with the forward threaded end of the chuck body, being provided for this purpose with an internal screw thread 50. At its forward end the shell extends over the forward side of the cam ring and is provided with a cylindrical bore 51, corresponding in diameter to the internal diameter of the cam ring, and extending forwardly to the inwardly extending end flange 52 which surrounds the entrance opening 53 for insertion of the work piece into the chuck jaws.

At its rearward end the closure shell is provided with a skirt portion 54 rotatably and slidably engaged within the annular recess 32 of the chuck body and adapted to move inwardly and outwardly within this recess as the shell is rotated to adjust the work receiving opening of the chuck jaws. Outward adjustment of the shell moves the cam ring forwardly, the latter being maintained in engagement with its recess 48 in the shell through the expansive pressure exerted upon the chuck jaws by the springs 45, this forward adjustment causing the pivot bosses 43 of the chuck jaws to ride forwardly and outwardly upon the slideway channels 38—38, the greater the forward movement the larger the chuck jaw opening for receiving the work piece. Fig. 13 illustrates the outwardly adjusted position at substantially maximum opening. Upon inward adjustment of the sleeve the cam ring moves rearwardly causing the chuck jaws to contract, as shown for example in Fig. 20. It will be observed that in any position of adjustment the V-shaped pivot bearings provided by the slideway channels 38—38 and the inclined cams 47 are the same in their relation to the pivot bosses 43.

In order to releasably retain the closure shell 49 in its adjusted position, there are provided within its rearward skirt portion a pair of diametrically opposed longitudinally extending grooves 55—55, in one of which is engaged a latch member 56 disposed in a guide passage 57 in the chuck body, this latch member being secured upon the forward end of a leaf spring 58, mounted at its rearward end within the cylindrical pocket 27 of the chuck body by means of a screw 59. Intermediate the ends of the spring there is secured a push button shaft 60 extended outwardly through a guide passage 61 into a pocket 62, where it is provided with a button end 63, a spring 64 being provided within the pocket beneath the bottom end and exerting outward pressure upon the latch to retain it in latching engagement with the sleeve. Upon releasing the latch, by pressing the button 63, the sleeve may be turned, the latch detenting into the grooves 55 as the latter come into register therewith. Hence, the adjustment may be automatically limited to a half turn, this half turn imparting an adjustment corresponding to half the pitch rise of the threads.

In order to determine the adjustment the sleeve is provided at diametrically opposed points, corresponding to the positions of the grooves 55—55, with calibrations 65—65, which cooperate with an index marking 66 upon the shoulder 33 of the chuck body. One set of calibrations is calibrated to indicate a full turn of the sleeve, while the other set is calibrated to indicate a half turn. For instance, one set may be calibrated in thirty-seconds of an inch while the other set is calibrated in sixty-fourths of an inch. It is thus possible to precisely gauge the adjustment of the chuck jaws to any desired dimension simply by releasing the sleeve and turning it to the point indicated by the calibrations and determined by the detenting of the latch 56 in the grooves 55.

The operation is substantially similar to the operation of the form of the invention shown in Figs. 1 to 10, the work piece being inserted in the chuck jaws and thereupon centered and gripped thereby as the chuck is rotated and centrifugal force causes the weight ends to swing outwardly and the jaw ends to swing inwardly. The work piece is released automatically as the rotation of the chuck is stopped.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a centrifugal chuck, a chuck body having an internal space therein and an inwardly extending flange at its forward end surrounding a central aperture, a plurality of chuck jaw members pivotally supported within said aperture upon said flange, and each including a work engaging jaw portion disposed at one side of the pivot axis and an overbalance weight portion disposed at the other side of the pivot axis, said weight portion being arranged for outward swinging movement within said internal space of said chuck body under centrifugal force.

2. In a centrifugal chuck, a rotatable support, a plurality of pivotal chuck jaw members supported thereby, each comprising a segment of an object of revolution divided along radial planes, and each including a work engaging jaw portion disposed at one side of the pivot axis and an overbalance weight portion disposed at the other side of the pivot axis, ball-bearing pivot-supports engaged between said jaw members and supported circumferentially by said rotatable support, said jaw members being arranged for swinging movement under centrifugal force.

3. In a centrifugal chuck, a chuck body having an internal space therein and an inwardly extending flange at its forward end surrounding a central aperture, a plurality of pivotal chuck jaw members supported within said chuck body, each comprising a segment of an object of revolution divided along radial planes, and each including a work engaging jaw portion disposed at one side of the pivot axis and an overbalance weight portion disposed at the other side of the pivot axis, ball-bearing pivot-supports engaged between said jaw members and supported upon said flange, said weight portions being arranged for outward swinging movement within said internal space of said chuck body under centrifugal force.

4. In a centrifugal chuck, a rotatable support, a plurality of pivotal chuck jaw members supported thereby, each comprising a segment of an object of revolution divided along radial planes, and each including a work engaging jaw portion disposed at one side of the pivot axis and an overbalance weight portion disposed at the other side of the pivot axis, ball-bearing pivot-supports engaged between said jaw members and outwardly supported circumferentially by said rotatable support, and an insert member engaged circumferentially inward of said ball-bearing pivot-supports, said jaw members being arranged for swinging movement under centrifugal force.

5. In a centrifugal chuck, a rotatable support, a plurality of chuck jaw members pivotally supported within said chuck body, and each including a work engaging jaw portion disposed at one side of the pivot axis and an overbalance weight portion disposed at the other side of the pivot axis, adjustment means cooperating between said support and said jaw members adapted to impart inward and outward adjustment movement to said jaw members and their pivot supports, said jaw members being arranged for swinging movement under centrifugal force.

6. In a centrifugal chuck, a rotatable support, a plurality of chuck jaw members pivotally supported within said chuck body, and each including a work engaging jaw portion disposed at one side of the pivot axis and an overbalance weight portion disposed at the other side of the pivot axis, adjustment means cooperating between said support and said jaw members adapted to impart inward and outward adjustment movement to said jaw members and their pivot supports, said jaw members being arranged for swinging movement under centrifugal force, and releasable detent means constructed and arranged to limit said adjustment movement to predetermined increments of adjustment.

7. In a centrifugal chuck, a chuck body having an internal space therein and an apertured bearing means having V-shaped bearing portions, a plurality of chuck jaw members pivotally supported within said chuck body and each including a pivot portion, a work engaging jaw portion disposed at one side of the pivot portion and an overbalance weight portion disposed at the other side of the pivot portion, said pivot portions being engaged with said bearing portions whereby said jaw members have swinging movement under centrifugal force.

8. In a centrifugal chuck, a chuck body having an internal space therein and an apertured bearing flange having radially slotted inclined bearing portions, an axially adjustable cam ring having inclined cam portions engaged with said slotted inclined bearing portions and constituting therewith radially adjustable V-shaped bearing portions, a plurality of chuck jaw members pivotally supported within said chuck body and each including a pivot portion, a work engaging jaw portion disposed at one side of the pivot portion and an overbalance weight portion disposed at the other side of the pivot portion, said pivot portions being engaged within said V-shaped bearing portions whereby said jaw members have swinging movement under centrifugal force.

9. In a centrifugal chuck, a rotatable support, a plurality of chuck jaw members pivotally supported within said chuck body, each comprising a segment of an object of revolution divided along radial longitudinally extending planes, and each including a pivot portion, a work engaging jaw portion disposed at one side of the pivot portion and an overbalance weight portion disposed at the other side of the pivot portion, bearing means carried by said support outwardly engaged circumferentially with said pivot portions of said jaw members whereby said jaw members have swinging movement under centrifugal force, and circumferentially arranged spring means engaged between said pivot portions of said jaw members and exerting outward pressure thereon.

10. In a centrifugal chuck, a rotatable support, a plurality of chuck jaw members pivotally supported within said chuck body, each comprising a segment of an object of revolution divided along radial longitudinally extending planes, and each including a pivot portion, a work engaging jaw portion disposed at one side of the pivot portion and an overbalance weight portion disposed at the other side of the pivot portion, bearing means carried by said support outwardly engaged circumferentially with said pivot portions of said jaw members whereby said jaw members have swinging movement under centrifugal force, circumferentially arranged spring means engaged between said pivot portions of said jaw members and exerting outward pressure thereon, and adjustment means constructed and arranged to impart inward and outward movement to said bearing means.

JAMES L. JOHNSTON.